United States Patent [19]

Hoxmeier et al.

[11] Patent Number: 4,980,331

[45] Date of Patent: Dec. 25, 1990

[54] HYDROGENATION CATALYST AND HYDROGENATION PROCESS WHEREIN SAID CATALYST IS USED

[75] Inventors: Ronald J. Hoxmeier, Houston; Lynn H. Slaugh, Cypress, both of Tex.

[73] Assignee: Shell Oil Company, Houston, Tex.

[21] Appl. No.: 363,234

[22] Filed: Jun. 8, 1989

[51] Int. Cl.$^5$ ............................................. B01J 31/14
[52] U.S. Cl. .................... 502/117; 502/110; 585/269; 585/277; 525/338
[58] Field of Search ................. 502/117, 110

[56] References Cited

U.S. PATENT DOCUMENTS

| | | | |
|---|---|---|---|
| 3,113,986 | 12/1963 | Breslow et al. | 260/683.9 |
| 3,333,024 | 7/1967 | Haefele et al. | 260/880 |
| 3,541,064 | 11/1970 | Yoshimoto et al. | 260/85.1 |
| 3,700,633 | 10/1972 | Wald et al. | 260/880 B |
| 4,461,846 | 7/1984 | Harris et al. | 502/108 X |
| 4,581,417 | 4/1986 | Buding et al. | 525/338 |
| 4,631,315 | 12/1986 | Buding et al. | 525/338 |
| 4,674,627 | 6/1987 | Benlcio | 198/821 |
| 4,701,432 | 10/1987 | Welborn | 502/117 X |
| 4,752,597 | 6/1988 | Turner | 502/117 X |

FOREIGN PATENT DOCUMENTS 1030306 9/1963 United Kingdom .
1558491 5/1975 United Kingdom .

*Primary Examiner*—Patrick P. Garvin

[57] ABSTRACT

A hydrogenation catalyst prepared by combining one or more Group VIII metal compounds with one or more alkylalumoxanes and one or more alkyls or hydrides of a metal selected from the group consisting of the Group Ia, IIa, and IIIa metals and a hydrogenation process wherein said catalyst is used to hydrogenate compounds containing ethylenic and/or aromatic unsaturation. Preferably, the one or more Group VIII metal compounds will be contacted sequentially with the one or more alkylalumoxanes and the one or more alkyls or hydrides, first with the one or more alkylalumoxanes and then with the one or more alkyls and/or hydrides. The one or more Group VIII metal compounds is selected from the group of compounds consisting of carboxylates, chelates, alkoxides, salts of acids containing sulfur, salts of partial esters of acids containing sulfur and salts of aliphatic and aromatic sulfonic acids. Nickel and cobalt compounds are preferred for use in the hydrogenation catalysts. Certain of the hydrogenation catalyst, particularly those prepared with a methylalumoxanes, initially exhibit less hydrogenation activity than catalysts known heretofore in the prior art and prepared with a metal alkyl and/or hydride of a metal selected from Groups Ia, IIa and IIIa of the Periodic Table of Elements. These catalysts, then, permit greater control over the extent of hydrogenation, particularly when partial hydrogenation is a desired end result. Ultimately, however, these catalyst permits substantially complete hydrogenation of both ethylenic and aromatic unsaturation.

14 Claims, No Drawings

HYDROGENATION CATALYST AND HYDROGENATION PROCESS WHEREIN SAID CATALYST IS USED

BACKGROUND

1. Field of the Invention

This invention relates to a hydrogenation catalyst and a hydrogenation process wherein said catalyst is used. More particularly, this invention relates to a hydrogenation catalyst and to a process wherein said catalyst is used to hydrogenate ethylenic and/or aromatic unsaturation.

2. Prior Art

Catalyst for hydrogenating chemical compounds containing ethylenic and/or aromatic unsaturation, are, of course, well known in the prior art. Useful catalysts include such heterogeneous catalysts as nickel on kieselguhr, Raney nickel, copper chromate, molybdenum sulfide, finely divided platinum, finely divided palladium, platinum oxide, copper chromium oxide and the like, as taught, for example, in U.S. Pat. No. 3,333,024. Useful catalysts also include homogeneous systems such as those prepared with rhodium compounds or complexes, as taught, for example, in U.K. Patent No. 1,558,491 and in U.S. Pat. Nos. 4,581,417 and 4,674,627 and those prepared with ruthenium complexes as taught, for example, in U.S. Pat. No. 4,631,315. As is known in the prior art, certain of these catalysts are quite effective in the hydrogenation of ethylenic unsaturation but many of these catalysts are not particularly selective as between ethylenic and aromatic unsaturation and therefore cannot be effectively used to selectively hydrogenate ethylenic unsaturation in a compound containing both ethylenic and aromatic unsaturation. Moreover, those catalysts involving the use of a rare or precious metal are not, generally, practical for large scale commercial use in processes wherein catalyst recovery is inefficient, as in polymer hydrogenation processes, due to their limited availability and relatively high costs.

Catalysts which are useful in the hydrogenation of ethylenic unsaturation, which catalyst may be used to effect selective hydrogenation as between ethylenic and aromatic unsaturation, also include catalysts which are frequently referred to as homogeneous systems prepared by combining an iron group metal compound, particularly a nickel or cobalt compound, with a reducing agent. Such catalyst may be the reaction product of an iron group metal alkoxide and an aluminum hydrocarbon compound as taught, for example, in U.S. Pat. No. 3,113,986; the reaction product of an iron group metal carboxylate, chelate or alkoxide and a lithium or magnesium hydrocarbon compound as taught, for example, in U.S. Pat. No. 3,541,064; the reaction product of a nickel or cobalt alkoxide or carboxylate and an aluminum trialkyl as taught, for example, in U.S. Pat. No. 3,700,633 or the reaction product of an iron group carboxylate, an enolate, a phenolate or a salt of certain sulfur-containing acids and half esters thereof and a metal alkyl of a metal selected from Groups I, II and III as taught for example in British Patent Specification 1,030,306. Nickel/Alkyl Aluminum hydrogenation catalysts have been improved by the addition of water in amounts from 0.4 to 1.3 moles of water per mole of nickel. As is known in the prior art, these catalysts can be used in a manner such that essentially all of any ethylenic unsaturation contained in the chemical compound is hydrogenated while essentially none of the aromatic unsaturation contained therein is hydrogenated. These catalysts, are, however, generally, far less active than the non-selective catalysts heretofore known in the prior art, and, as a result, longer holding times are frequently required to effect a high degree of selective hydrogenation. Further, most, if not all, of these selective catalysts generally result in significant conversion of ethylenic unsaturation in relatively short contacting times, thereby preventing good control over the extent of conversion of the ethylenic unsaturation when partial hydrogenation is the desired objective.

More recently, it has been discovered that better control over the rate and extent of the hydrogenation can be achieved if a catalyst prepared by combining a Group VIII metal compound with certain alumoxanes, particularly a methylalumoxane, is used, as taught in U.S. patent application Ser. No. 07/289,158, which application was filed Dec. 23, 1988 and pending concurrently herewith. As indicated in this application, the hydrogenation with catalysts prepared with methylalumoxanes proceeds, initially at least, at a slower rate while a higher degree of hydrogenation can ultimately be achieved in reasonable holding times.

In light of the deficiencies of the prior art catalysts, then, the need for a catalyst which can be prepared with more readily available metals and be used to selectively hydrogenate ethylenic unsaturation in a chemical compound containing both ethylenic and aromatic unsaturation, which catalyst also enables increased hydrogenation in reasonable holding times when compared to the selective catalyst known in the prior art and still affords better control over the extent of hydrogenation, is believed to be readily apparent.

SUMMARY OF THE INVENTION

It has now been discovered that the foregoing and other disadvantages of the prior art catalyst useful in hydrogenating ethylenic and/or aromatic unsaturation can be overcome or at least reduced with the catalyst of this invention. It is, therefore, an object of the present invention to provide an improved catalyst for hydrogenating ethylenic and/or aromatic unsaturation. It is another object of this invention to provide a hydrogenation process wherein said improved catalyst is used to hydrogenate ethylenic and/or aromatic unsaturation. It is still another object of this invention to provide such an improved hydrogenation catalyst which can be used to selectively hydrogenate ethylenic unsaturation when aromatic unsaturation is also present. It is a still further object of this invention to provide such an improved hydrogenation catalyst which will permit a greater extent of hydrogenation in reasonable holding times when compared to known selective hydrogenation catalyst. It is even a further object of this invention to provide certain improved hydrogenation catalyst which will afford good control over the extent to which the hydrogenation has proceeded. The foregoing and other objects and advantages will become apparent from the description set forth hereinafter.

In accordance with the present invention, the foregoing and other objects and advantages are accomplished with a catalyst obtained by combining one or more Group VIII metal compounds with one or more alkylalumoxanes and one or more alkyls or hydrides of a Group Ia, IIa, or IIIa metal and with a process wherein said catalyst is used to partially or completely hydrogenate ethylenic and/or aromatic unsaturation contained in a chemical compound or composition. As discussed more fully hereinafter, the catalyst of this invention may be used to selectively hydrogenate ethylenic unsaturation in a compound containing both ethylenic and aromatic unsaturation. As also discussed more fully hereinafter, the extent of hydrogenation, initially at least, proceeds slowly, at least with certain of the catalysts, thereby making it possible to more accurately control the extent of hydrogenation. The catalysts also may be used at more severe hydrogenation conditions so as to hydrogenate both ethylenic and aromatic unsaturation in compounds containing both types of unsaturation.

DETAILED DESCRIPTION OF THE INVENTION

As just indicated supra, the present invention is drawn to a catalyst prepared by combining one or more Group VIII metal compounds with one or more alkylalumoxanes and one or more alkyls or hydrides of a Group Ia, IIa or IIIa metal and to a hydrogenation process wherein said catalyst is used to hydrogenate ethylenic and/or aromatic unsaturation contained in a chemical compound or composition. The catalyst may be used to selectively hydrogenate ethylenic unsaturation in a compound containing both ethylenic and aromatic unsaturation. Certain of the catalysts at least may also be used to more carefully control the extent of hydrogenation in such compounds or compositions. The catalysts may further be used at more severe hydrogenation conditions so as to hydrogenate at least a portion of both the ethylenic and aromatic unsaturation in compounds or compositions containing both types of unsaturation. As used herein, all reference to metals of a specified Group shall be by reference to the Groups as depicted in the Periodic Chart of the Elements appearing inside the front cover of the Merck Index, 9th Edition, 1976.

In general, any of the Group VIII metal compounds known to be useful in the preparation of catalysts for the hydrogenation of ethylenic unsaturation can be used separately or in combination to prepare the catalysts of this invention. Suitable compounds, then, include Group VIII metal carboxylates having the formula $(RCOO)_nM$ wherein M is a Group VIII metal, R is a hydrocarbyl radical having from 1 to about 50 carbon atoms, preferably from about 5 to about 30 carbon atoms, and n is a number equal to the valence of the metal M; alkoxides having the formula $(RCO)_nM$ wherein M is again a Group VIII metal, R is a hydrocarbon radical having from 1 to about 50 carbon atoms, preferably from about 5 to about 30 carbon atoms, and n is a number equal to the valence of the metal M; chelates of the metal prepared with $\beta$-ketones, $\alpha$-hydroxycarboxylic acids $\beta$-hydroxycarboxylic acids, $\beta$-hydroxycarbonyl compounds and the like; salts of sulfur-containing acids having the general formula $M(SO_x)_n$ and partial esters thereof; and salts of aliphatic and aromatic sulfonic acids having from 1 to about 20 carbon atoms. Preferably, the Group VIII metal will be selected from the group consisting of nickel and cobalt, most preferably, the Group VIII metal will be nickel. The metal carboxylates useful in preparing the catalyst of this invention include Group VIII metal salts of hydrocarbon aliphatic acids, hydrocarbon cycloaliphatic acids and hydrocarbon aromatic acids. Examples of hydrocarbon aliphatic acids include hexanoic acid, ethylhexanoic acid, heptanoic acid, octanoic acid, nonanoic acid, decanoic acid, dodecanoic acid, myristic acid, palmitic acid, stearic acid, oleic acid, linoleic acid, rhodinic acid and the like. Examples of hydrocarbon aromatic acids include benzoic acid and alkyl-substituted aromatic acids in which the alkyl substitution has from 1 to about 20 carbon atoms. Examples of cycloaliphatic acids include naphthenic acid, cyclohexylcarboxylic acid, abietic-type resin acids and the like. Suitable chelating agents which may be combined with various Group VIII metal compounds thereby yielding a Group VIII metal chelate compound useful in the preparation of the catalyst of this invention include $\beta$-ketones, $\alpha$-hydroxycarboxylic acids, $\beta$-hydroxy carboxylic acids, $\beta$-hydroxycarbonyl compounds and the like. Examples of $\beta$-ketones which may be used include acetylacetone, 1,3-hexanedione, 3,5-nonadione, methylacetoacetate, ethylacetoacetate and the like. Examples of $\alpha$-hydroxycarboxylic acids which may be used include lactic acid, glycolic acid, $\alpha$-hydroxyphenylacetic acid, $\alpha$-hydroxy-$\alpha$-phenylacetic acid, $\alpha$-hydroxycyclohexylacetic acid and the like. Examples of $\beta$-hydroxycarboxylic acids include salicylic acid, alkyl-substituted salicylic acids and the like. Examples of $\beta$-hydroxylcarbonyl compounds that may be used include salicylaldehyde, o-hydroxyacetophenone and the like. The metal alkoxides useful in preparing the catalysts of this invention include Group VIII metal alkoxides of hydrocarbon aliphatic alcohols, hydrocarbon cycloaliphatic alcohols and hydrocarbon aromatic alcohols. Examples of hydrocarbon aliphatic alcohols include hexanol, ethylhexanol, heptanol, octanol, nonanol, decanol, dodecanol and the like. The Group VIII metal salts of sulfur-containing acids and partial esters thereof include Group VIII metal salts of sulfonic acid, sulfuric acid, sulphurous acid, partial esters thereof and the like. Of the sulfonic acids, aromatic sulfonic acids such as benzene sulfonic acid, p-toluene sulfonic acid and the like are particularly useful.

In general, any of the alkylalumoxane compounds known to be useful in the preparation of olefin polymerization catalysts may be used in the preparation of the hydrogenation catalyst of this invention. Alkylalumoxane compounds useful in preparing the catalyst of this invention may, then, be cyclic or linear. Cyclic alkylalumoxanes may be represented by the general formula $(R-Al-O)_m$ while linear alkylalumoxanes may be represented by the general formula $R(R-Al-O)_nAlR_2$. In both of the general formulae R will be an alkyl group having from 1 to about 8 carbon atoms such as, for example, methyl, ethyl, propyl, butyl and pentyl and the like, m is an integer from 3 to 40 and n is an interger from 1 to about 40. In a preferred embodiment of the present invention, R will be methyl, m will be a number from about 5 to about 20 and n will be a number from about 10 to about 20. As is well known alkylalumoxanes may be prepared by reacting an aluminum alkyl with water. Generally, the resulting product will be a mixture of both linear and cyclic compounds.

As is well known, contacting of the aluminum alkyl and water may be accomplished in several ways. For example, the aluminum alkyl may first be dissolved in a suitable solvent such as toluene or an aliphatic hydrocarbon and the solution then contacted with a similar solvent containing relatively minor amounts of moisture. Alternatively, an aluminum alkyl may be contacted with a hydrated salt such as hydrated copper sulfate or ferrous sulfate. When this method is used, a hydrated ferrous sulfate is frequently used. According to this method, a dilute solution of aluminum alkyl in a suitable solvent such as toluene is contacted with hydrated ferrous sulfate. In general, about 1 mole of hydrated ferrous sulfate will be contacted with from about 6 to about 7 moles of the aluminum trialkyl. When aluminum trimethyl is the aluminum alkyl actually used, methane will be evolved as conversion of the aluminum alkyl to an alkylalumoxane occurs.

In general, any of the Group Ia, IIa or IIIa metal alkyls or hydrides known to be useful in preparing hydrogenation catalysts in the prior art may be used to prepare the catalyst of this invention. In general, the Group Ia, IIa or IIIa metal alkyls will be peralkyls with each alkyl group being the same or different containing from 1 to about 8 carbon atoms and the hydrides will be perhydrides although alkylhydrides should be equally useful. Aluminum, magnesium and lithium alkyls and hydrides are particularly useful and these compounds are preferred for use in preparing the catalyst of this invention. Aluminum trialkyls are most preferred.

In general, the one or more alkylalumoxanes and the one or more Group Ia, IIa or IIIa metal alkyls or hydrides may be combined and then contacted with the one or more Group VIII metal compounds or the one or more alkylalumoxanes and the one or more Group Ia, IIa or IIIa metal alkyls or hydrides may be sequentially contacted with the one or more Group VIII metal compounds with the proviso that when sequential contacting is used, the one ore more alkylalumoxanes will be first contacted with the one or more Group VIII metal compounds. Of these two methods, sequential contacting appears to yield the best results. Sequential contacting is, therefore, preferred. With respect to the contacting step and while the inventors do not wish to be bound by any particular theory, it is believed that the two different reducing agents; i.e., the alkylalumoxanes and the alkyls or hydrides, react with the Group VIII metal compound in such a way as to yield different reaction products. While still not wishing to be bound by any particular theory, it is also believed that the Group Ia, IIa and IIIa metal alkyls and hydrides are a stronger reducing agent than the alkylalumoxanes and, as a result, if the Group VIII metal is allowed to be completely reduced with a Group Ia, IIa or IIIa metal alkyl or hydride, the alkylalumoxanes will make little or no contribution. If the Group VIII metal is first reduced with one or more alkylalumoxanes, however, the reaction product obtained with the alumoxane can, apparently, be further reduced or otherwise altered by reaction with a Group Ia, IIa or IIIa metal alkyl or hydride. In general, and whether contacting is accomplished concurrently or sequentially, the one or more alkylalumoxanes will be combined with the one or more Group VIII metal compounds at a concentration sufficient to provide an aluminum to Group VIII metal atomic ratio within the range from about 1.5:1 to about 20:1 and the one or more Group Ia, IIa or IIIa metal alkyls or hydrides will be combined with one or more Group VIII metal compounds at a concentration sufficient to provide a Group Ia, IIa or IIIa metal to Group VIII metal atomic ratio within the range from about 0.1:1 to about 20:1. In general, contacting between the one or more Group VIII compounds and the one or more alkylalumoxanes and the one or more alkyls or hydrides will be accomplished at a temperature within the range from about 20° C. and about 100° C. The contacting will, generally, be continued for a period of time within the range from about 1 to about 120 minutes. When sequential contacting is used, each of the two contacting steps will be continued for a period of time within this same range.

In general, the hydrogenation catalyst will be prepared by combining the one or more Group VIII metal compounds with the one or more alkylalumoxanes and the one or more Group Ia, IIa or IIIa metal alkyls or hydrides in a suitable solvent. In general, the solvent used for preparing the catalyst may be anyone of those solvents known in the prior art to be useful as solvents for unsaturated hydrocarbon polymers. Suitable solvents include aliphatic hydrocarbons such as hexane, heptane, octane and the like, cycloaliphatic hydrocarbons such as cyclopentane, cyclohexane, and the like, alkyl-substituted cycloaliphatic hydrocarbons such as methylcyclopentane, methylcyclohexane, methylcyclooctane and the like, aromatic hydrocarbons such as benzene, hydroaromatic hydrocarbons such as decalin, tetralin and the like, alkyl-substituted aromatic hydrocarbons such as toluene, xylene and the like, halogenated aromatic hydrocarbons such as chlorobenzene and the like and linear and cyclic ethers such as the various dialkyl ethers, polyethers, particularly diethers, tetrahydrofuran and the like. In general, a suitable hydrogenation catalyst will be prepared by combining the catalyst components in a separate vessel prior to feeding the same to the hydrogenation reactor.

In general, the hydrogenation catalyst of this invention may be used to partially or completely hydrogenate any hydrocarbon or substituted hydrocarbon containing either ethylenic unsaturation and/or aromatic unsaturation. The catalyst of this invention is particularly useful for the hydrogenation of hydrocarbon and substituted hydrocarbon polymers. When the hydrocarbon or substituted hydrocarbon polymer to be hydrogenated contains both ethylenic and aromatic unsaturation, the hydrogenation catalyst of this invention can be used at hydrogenation temperatures, hydrogen partial pressures and nominal holding times which will enable partial, complete or selective hydrogenation. In this regard, it will be appreciated that ethylenic unsaturation, particularly that which does not contain hydrocarbyl substitution on both of the carbon atoms contained in the ethylenic unsaturation group; i.e., ethylenic unsaturation containing at least one hydrogen atom bonded to at least one of the carbon atoms contained in the double bond, will hydrogenate at milder hydrogenation conditions than will aromatic unsaturation. As a result, selective hydrogenation can be accomplished such that at least a portion of the ethylenic unsaturation is hydrogenated while essentially none of the aromatic unsaturation is hydrogenated. In fact, selective hydrogenation can be accomplished with the hydrogenation catalyst of this invention such that substantially all of the ethylenic unsaturation which does not contain hydrocarbyl substitution on both of the carbon atoms contained in the ethylenic unsaturation can be saturated while essentially none of the aromatic unsaturation is hydrogenated. At more severe conditions, however, at least a portion of the aromatic unsaturation will also be hydrogenated and if contacting is continued for a sufficient period of time substantially all of the ethylenic and aromatic unsaturation can be hydrogenated.

The hydrogenation catalyst of this invention may be used to hydrogenate essentially any polymer containing ethylenic and/or aromatic unsaturation. The hydrogenation catalyst of this invention will also hydrogenate any acetylenic unsaturation that may be contained in a polymer. In general, however, and while the polymer or other unsaturated compound may be substituted with various functional groups, the polymers or other unsaturated compounds actually hydrogenated with the hydrogenation catalyst of this invention should be essentially free of functional groups that will react with the catalyst or a component used to prepare the same thereby deactivating the catalyst. In general, such groups include both those which are strongly acidic (pH<5) and those which are strongly basic (pH>9). The substitutions that may be on the hydrocarbon compound, then, would be those which, when dissolved in water, would have a pH within the range from about 5 to about 9.

The hydrogenation catalyst of this invention will be particularly effective for hydrogenating polymers containing ethylenic unsaturation and/or aromatic unsaturation. As is well known, polymers containing ethylenic unsaturation can be prepared by polymerizing one or more polyolefins, particularly diolefins. The polyolefins may be polymerized alone or in combination with other vinyl monomers such as acrylates, methacrylates, vinylalcohol, vinyl ethers, monoolefins, vinyl halides and the like. Polymers containing aromatic unsaturation may be prepared by polymerizing one or more alkenyl aromatic hydrocarbons. The alkenyl aromatic hydrocarbons may be polymerized alone or in combination with other copolymerizable vinyl monomers. For example, alkenyl aromatic hydrocarbons may be copolymerized with monoolefins, vinyl and allyl esters, vinyl halides, and the like. As is also well known, polyolefins, particularly conjugated diolefins, and alkenyl aromatic hydrocarbon, particularly monoalkenyl aromatic hydrocarbons, can be copolymerized to produce polymers containing both ethylenic and aromatic unsaturation. The hydrogenation catalyst of this invention may be used to either partially or substantially completely hydrogenate ethylenic unsaturation contained in a polymer. The hydrogenation catalyst of this invention may also be used to either partially or completely hydrogenate both ethylenic and aromatic unsaturation in polymers containing both types of unsaturation. The hydrogenation catalyst of this invention may further be used to selectively hydrogenate ethylenic unsaturation in polymers containing both ethylenic and aromatic unsaturation. As used herein, the recitation "selective hydrogenation" shall mean hydrogenation accomplished such that ethylenic unsaturation is hydrogenated while aromatic unsaturation is not or at least wherein the amount of ethylenic unsaturation hydrogenated is significantly greater than the amount of aromatic unsaturation hydrogenated.

As is well known in the prior art, polymers containing ethylenic and/or aromatic unsaturation may be prepared using free-radical, cationic and anionic initiators or polymerization catalysts. Such polymers may also be prepared using bulk, solution or emulsion techniques. It is, of course, known in the prior art that all polymers cannot be prepared with each of these initiators or catalysts and that all polymers cannot be prepared with each of the different techniques. Which polymers may be prepared with the several catalysts and which polymers may be prepared with the various techniques is, however, well known in the prior art and need not be discussed herein in detail. As indicated more fully hereinafter, however, the actual hydrogenation of the polymer or other unsaturated compound will be accomplished in solution. It is, therefore, important to the hydrogenation method of this invention that the polymer or other unsaturated compound actually hydrogen be soluble in a solvent.

As indicated supra, the hydrogenation catalyst of this invention is particularly useful for hydrogenating hydrocarbon polymers containing ethylenic and/or aromatic unsaturation. The present invention will, therefore, be described in greater detail by reference to such polymers. It should, however, be kept in mind, as indicated supra, that any hydrocarbon or substituted hydrocarbon or any polymer containing such unsaturation which is also soluble in a suitable solvent could be substituted for the hydrocarbon polymer with which the invention will be described in greater detail. Also, while the polymer actually hydrogenated may be prepared using bulk, solution or emulsion techniques, as indicated supra, the invention is particularly effective with polymers prepared in solution since the hydrogenation may be accomplished immediately after preparation while the polymer remains in solution. Polymers prepared with bulk or emulsion techniques, however, could be recovered and then dissolved in a solvent to effect hydrogenation with the hydrogenation catalyst of this invention.

As is well known, homopolymers of conjugated diolefins, copolymers of conjugated diolefins and copolymers of one or more conjugated diolefins and one or more other monomers, particularly a monoalkenyl aromatic hydrocarbon monomer, are commonly prepared in solution with an anionic polymerization initiator and the hydrogenation catalyst of this invention is particularly effective in both the partial, complete and selective hydrogenation of such polymers. As is well known, such polymers may be random, tapered, block or radial. In general, polymers of this type are prepared by contacting the monomer or monomers to be polymerized with an organoalkali metal compound in a suitable solvent at a temperature within the range from about $-150°$ C. to about 300° C., preferably at a temperature within the range from about 0° C. to about 100° C. When the polymer is to be tapered, all of the monomers to be contained in the polymer are, frequently, introduced together at the beginning of the polymerization. When the polymer is to be random, a randomizing agent is generally used. When the polymer is to be a linear block, the monomers are, generally, polymerized sequentially and when the polymer is to be a radial polymer, the polymeric arms are first prepared and then coupled with a satisfactory coupling agent. Particularly effective anionic polymerization initiators are organolithium compounds having the general formula:

$$RLi_n$$

wherein:

R is an aliphatic, cycloaliphatic, aromatic or alkyl-substituted aromatic hydrocarbon radical having from 1 to about 20 carbon atoms; and n is an integer of 1 to 4. Conjugated diolefins which may be polymerized separately or in combination anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are, preferably, used in such polymers and conjugated diolefins containing 4 or 5 carbon atoms are most preferably used in such polymers. As indicated supra, the conjugated diolefin polymers prepared via anionic initiation may contain one or more other monomers, particularly a monoalkenyl aromatic hydrocarbon monomer. Suitable monoalkenyl aromatic hydrocarbon monomers include styrene, various alkyl-substituted styrenes, alkoxy-substituted styrenes, vinyl naphthalene, alkyl-substituted vinyl naphthalenes and the like. Conjugated diolefin polymers which may be hydrogenated with the hydrogenation catalyst of the present invention include those homopolymers and copolymers described in U.S. Pat. Nos. 3,135,716; 3,150,209; 3,496,154; 3,498,960; 4,145,298 and 4,238,202, the disclosure of which patents are herein incorporated by reference. Conjugated diolefin polymers which may be partially, completely or selectively hydrogenated with the hydrogenation catalyst of this invention also include block copolymers such as those described in U.S. Pat. Nos. 3,231,635; 3,265,765 and 3,322,856, the disclosure of which patents are also incorporated herein by reference. In general, linear block copolymers which may be hydrogenated in accordance with the present invention include those which may be represented by the general formula:

$$A_z-(B-A)_y-B_x$$

wherein:

A is a polymeric block comprising predominantly monoalkenyl aromatic hydrocarbon monomer units, B is a polymeric block containing predominantly conjugated diolefin monomer units, x and z are, independently, a number equal to 0 or 1, and y is a whole number ranging from 1 to about 15.

Conjugated diolefin polymers which may be partially, completely or selectively hydrogenated with the hydrogenation catalyst of this invention further include radial block copolymers such as those described in U.S. Pat. Nos. 4,033,888; 4,077,893; 4,141,847; 4,391,949 and 4,444,953, the disclosure of which patents are also incorporated herein by reference. Radial block copolymers which may be hydrogenated with the hydrogenation catalyst of the present invention may include those which be represented by the general formulae:

$$[B_x-(A-B)_y-A_z]_n-C; \text{ and } [B_x-(A-B)_y-A_z]_{n'}-C-B'_{n''}$$

wherein:

A, B, x, y and z are as previously defined;

n is a number from 3 to about 30, c is the core or nucleus of the radial polymer formed with a polyfunctional coupling agent;

B' is a polymeric block containing predominantly conjugated diolefin units, which B' may be the same or different from B; and n' and n'' are integers representing the number of each type of arm and the sum of n'+n'' is a number from 3 to about 30.

As used herein in connection with block compositions, the recitation predominantly means that the principle (at least 85%) constituent in that block. Other copolymerizable monomers may, however, be present.

In general, hydrogenation of the unsaturated compound with the hydrogenation catalyst of this invention may be accomplished in any of the solvents for such compound known in the prior art. Such solvents include straight- and branched-chain aliphatic hydrocarbons, cycloaliphatic hydrocarbons, alkyl-substituted cycloaliphatic hydrocarbons, aromatic hydrocarbons, alkyl-substituted aromatic hydrocarbons, halogenated hydrocarbons, linear and cyclic ethers and the like. Suitable solvents then include, but are not limited to, pentane, hexane, heptane, octane, cyclohexane, cycloheptane, methylcyclohexane, benzene, toluene, xylene, chlorobenzene, dichlorobenzene, diethyl ether, tetrahydrofuran and the like. In general, the solution of polymer and solvent will contain from about 1 wt % to about 30 wt % polymer and from about 99 wt % to about 70 wt % solvent.

In general, the hydrogenation will be accomplished at a temperature within the range from about 20° C. to about 175° C. at a total pressure within the range from about 50 psig to about 5,000 psig and at a hydrogen partial pressure within the range from about 50 psig to about 3,000 psig. In general, the catalyst or the components thereof will be added in a concentration sufficient to provide from about 0.2 to about 100 mmoles (gm moles) of Group VIII metal per lb of polymer or other unsaturated compound being hydrogenated. In general, contacting at hydrogenation conditions will be continued for a nominal holding time within the range from about 10 to about 360 minutes. It will, of course, be appreciated that the more severe hydrogenation conditions at longer nominal holding times will, generally, result in complete or near complete hydrogenation of the polymer while milder hydrogenation conditions and shorter holding times favor partial hydrogenation and may be used to effect selective hydrogenation as between ethylenic and aromatic unsaturation. Of the several variables available to control the extent of hydrogenation, temperature and catalyst concentration and nominal holding time, generally, have the greatest affect on the extent of hydrogenation, particularly where selective hydrogenation is the desired result. Hydrogen partial pressure, on the other hand, generally, has a lesser affect on selectivity as between the hydrogenation of ethylenic unsaturation and hydrogenation of aromatic unsaturation. Nominal holding time will, of course, significantly affect the extent of hydrogenation in those cases where partial hydrogenation of either ethylenic unsaturation or aromatic unsaturation is the desired result.

In general, selective hydrogenation as between ethylenic and aromatic unsaturation will be accomplished at a temperature within the range from about 20 to about 100° C. at a total pressure within the range from about 50 to about 1,000 psig at a hydrogen partial pressure within the range from about 50 to about 950 psig. Nominal holding times within the range from about 30 to about 240 minutes will, generally, be used to effect selective hydrogenation. In general, the hydrogenation catalyst of this invention can be used to effect substantially complete hydrogenation of any ethylenic unsaturation contained in a polymer without effecting any significant hydrogenation of any aromatic unsaturation contained in the same polymer. Partial hydrogenation of the ethylenic unsaturation in such a polymer can, of course, be accomplished by reducing the nominal holding time, the temperature and/or the hydrogen partial pressure. In general, partial, complete and/or selective hydrogenation will be accomplished without any significant degradation of the polymer.

While the inventor does not wish to be bound by any particular theory, it is believed that when the components used to prepare the hydrogenation catalyst of this invention are combined a reaction or reactions occur to form a catalyst. The catalyst thus formed is stable and can be stored for relatively long periods prior to use.

After hydrogenation of the polymer has been completed, the polymer may be recovered as a crumb by adding a polar compound such as an alcohol or the like to the polymer solution thereby precipitating the polymer as a crumb. Alternatively, the solution may be contacted with steam or hot water and the solvent then removed by azeotropic distillation. Generally, these recovery techniques will also effectively remove a significant portion of the catalyst. To the extent that further catalyst removal is desired, however, methods well known in the prior art may be used.

The hydrogenated polymers produced by the method of this invention can be used in any of the applications well known in the prior art for such hydrogenated polymers. For example, hydrogenated conjugated diolefin polymers will have improved green strength and cold flow properties and may be used as VI improvers, impact modifiers, in adhesive compositions and the like. Similarly, selectively hydrogenated conjugated diolefin-monoalkenyl aromatic hydrocarbon polymers may be used in various molding compositions, in adhesive compositions, as VI improvers and the like.

PREFERRED EMBODIMENT OF THE INVENTION

In a preferred embodiment of the present invention, one or more nickel and/or cobalt carboxylates will be combined sequentially, first with a blend of alkylalumoxanes, having the general formulae $(R-Al-O)_m$ and $R(R-Al-O)_nAlR_2$ wherein R is a methyl radical, m is a number from 5 to 20 and n is a number from 10 to 20 and then with one or more aluminum trialkyls, each of the alkyl groups being the same or different and having from 1 to about 5 carbon atoms therein, to produce a hydrogenation catalyst. The contacting between the one or more nickel and/or cobalt carboxylates and the aluminum containing compounds will be accomplished at a temperature within the range from about 25° C. to about 60° C. in a cycloaliphatic hydrocarbon solvent. In the preferred embodiment, the contacting with the one or more alkylalumoxanes will be accomplished at an Al:Ni, Al:Co or Al:Ni+Co atomic ratio within the range from about 2:1 to about 12:1 on a mole or atom basis and the contacting with the one or more aluminum trialkyls will be accomplished at an Al:Ni, Al:Co or Al:Ni+Co atomic ratio within the range from about 1:1 to about 10:1. In the preferred embodiment, the contacting between the one or more nickel and/or cobalt carboxylates and the one or more alkylalumoxane will be continued for a nominal holding time between about 15 and about 60 minutes and the one or more aluminum trialkyls then added to the reaction product thus obtained and contacting continued for a nominal holding time within the range from about 15 to about 60 minutes. In a most preferred embodiment of the present invention, the nickel carboxylate will be selected from the group consisting of nickel octoate and nickel ethylhexanoate and the cycloaliphatic hydrocarbon solvent will be cyclohexane. In a preferred process embodiment of the present invention, the preferred catalyst will be used to selectively hydrogenate a block copolymer comprising at least one polymeric block containing predominantly monoalkenyl aromatic hydrocarbon monomer units and at least one polymeric block containing predominantly conjugated diolefin monomer units. In the preferred embodiment, the monoalkenyl aromatic hydrocarbon polymer blocks will have a weight average molecular weight within the range from about 5,000 to about 40,000 and the conjugated diolefin polymer blocks will have a weight average molecular weight within the range from about 25,000 to about 125,000. In a preferred process embodiment, the hydrogenation will be accomplished in a cycloaliphatic hydrocarbon solvent, the solution containing from about 10 to about 25 wt % polymer and from about 75 to about 25 wt % solvent. In the preferred process embodiment, the hydrogenation will be accomplished at a temperature within the range from about 20 to about 100° C. at a total pressure within the range from about 50 to about 1,000 psig, at a hydrogen partial pressure within the range from about 50 to about 950 psig and in the presence of from about 1 to about 10 mmoles (gm moles) of Ni and/or Co per lb of polymer. In the preferred process embodiment, the hydrogenation conditions will be continued for a nominal holding time within the range from about 30 to about 240 minutes. In the preferred process embodiment, the selective hydrogenation will be accomplished so as to hydrogenate at least 80% of the ethylenic unsaturation initially contained in the polymer and less than about 5% of the aromatic unsaturation contained therein. In a most preferred process embodiment, the most preferred catalyst will be used and the selective hydrogenation will be accomplished so as to hydrogenate at least 95% of the ethylenic unsaturation initially contained in the polymer while hydrogenating essentially none of the aromatic unsaturation contained therein.

Having thus broadly described the present invention and a preferred and most preferred embodiment thereof, it is believed that the invention will become even more apparent by reference to the following Examples. It will be appreciated, however, that the examples are presented solely for purposes of illustration and should not be construed as limiting the invention unless one or more of the limitations introduced in the Examples are incorporated into the claims appended hereto and then only to the extent that such limitations are thus incorporated.

EXAMPLE 1

In this Example, a hydrogenation catalyst was prepared by first combining a methylalumoxane with nickel-2-ethylhexanoate in cyclohexane at a temperature of 25° C. and then adding triethyl aluminum. In preparing the catalyst in this Example, the amount of alumoxane combined with nickel-2-ethylhexanoate was sufficient to provide an alumoxane-nickel-2-ethylhexanoate mixture having an Al:Ni atomic ratio of 3:1. The contacting of the nickel-2-ethylhexanoate was continued for 30 minutes before the triethyl aluminum was added. When the triethyl aluminum was added, a sufficient amount was added to provide an Al (from triethyl aluminum)-:Ni atomic ratio of 1:1. Contacting was continued for an additional 30 minutes after the triethyl aluminum was added. For convenience, this catalyst will be referred to hereinafter as catalyst 1. This catalyst was used shortly after preparation to hydrogenate a block copolymer as summarized in Example 6.

EXAMPLE 2

In this Example, a hydrogenation catalyst was prepared by first combining an ethylalumoxane with nickel-2-ethylhexanoate in cyclohexane at a temperature of 25° C. and then adding triethyl aluminum. In preparing the catalyst in this Example, the amount of alumoxane combined with nickel-2-ethylhexanoate was sufficient to provide an alumoxane-nickel-2-ethylhexanoate mixture having an Al:Ni atomic ratio of 3:1. The contacting of the nickel-2-ethylhexanoate and the ethylalumoxane was continued for 30 minutes before the triethyl aluminum was added. When the triethyl aluminum was added, a sufficient amount was added to provide an Al (from triethyl aluminum):Ni alomic ratio of 1:1. Contacting was continued for an additional 30 minutes after the triethyl aluminum was added. For convenience, this catalyst will be referred to hereinafter as catalyst 2. This catalyst was used shortly after preparation to hydrogenate a block copolymer as summarized in Example 6.

EXAMPLE 3

In this Example, a catalyst was prepared by combining nickel-2-ethylhexanoate with triethyl aluminum in cyclohexane at a temperature of 25° C. In preparing this catalyst, the nickel-2-ethylhexanoate and triethyl aluminum were combined in an Al:Ni atomic ratio of 2.2:1. This catalyst, which is hereinafter referred to as catalyst 3, was used shortly after preparation to hydrogenate a block copolymer as summarized in Example 6.

EXAMPLE 4

In this Example, a catalyst was prepared by combining nickel-2-ethylhexanoate with a methylalumoxane in cyclohexane at a temperature of 25° C. In preparing this catalyst, the nickel-2-ethylhexanoate and methylalumoxane were combined in an Al:Ni atomic ratio of 4:1. This catalyst, which is hereinafter referred to as catalyst 4, was used shortly after preparation to hydrogenate a block copolymer as summarized in Example 6.

EXAMPLE 5

In this Example, a catalyst was prepared by combining nickel-2-ethylhexanoate with an ethylalumoxane in cyclohexane at a temperature of 25° C. In preparing this catalyst, the nickel-2-ethylhexanoate and the ethylalumoxane were combined in an Al:Ni atomic ratio of 3:1. This catalyst, which is hereinafter referred to as catalyst 5, was used shortly after preparation to hydrogenate a block copolymer as summarized in Example 6.

EXAMPLE 6

In this Example, the five catalysts prepared in Examples 1-5 were used to hydrogenate a linear triblock copolymer comprising terminal polystyrene blocks, each polystyrene block having a weight average molecular weight of 7,200 and a central polybutadiene block having a weight average molecular weight of 35,300. In each of the hydrogenation runs, the polymer was dissolved in cyclohexane, the solution containing 20 wt % polymer and 80 wt % cyclohexane. In each run, the polymer solution was charged to an autoclave, the contents of the autoclave blanketed with hydrogen at a total pressure of about 900 psig and a hydrogen partial pressure of about 900 psig and the contents of the autoclave then heated to 70° C. A sufficient amount of catalyst was then injected into the autoclave to provide 100 ppm Ni, by weight, based on total solution. After the catalyst was injected, the reaction medium was raised to a temperature of 90° C. The contents of the autoclave were then held at these conditions for three hours while maintaining a hydrogen partial Pressure of 900 psig. A sample of the reaction medium was withdrawn from the reactor after 30 minutes, 60 minutes, 2 hours and at completion of the run and analyzed to determine the % of the initial ethylenic unsaturation which had been saturated. The extent of hydrogenation was determined using an ozone titration. Contacting between the polymer and the ozone was accomplished at 25° C. The amount of ozone actually reacting with the polymer was determined and this value then used to determine the amount of ethylenic unsaturation remaining. The results actually achieved in each of the five runs is summarized in the following

TABLE

| Catalyst No. | Al:Ni Atomic Ratio | % Initial —C=C— converted after | | | |
|---|---|---|---|---|---|
| | | 30 min | 60 min | 120 min | 180 min |
| 1 | 4:1 | 30.0 | 64.3 | 93.6 | 96.4 |
| 2 | 4:1 | 89.4 | 95.1 | 96.0 | 96.2 |
| 3 | 2.2:1 | 83.0 | 88.5 | 92.7 | 93.4 |
| 4 | 4:1 | 12.3 | 41.5 | 70.0 | 86.7 |
| 5 | 3:1 | 87.3 | 94.5 | 95.0 | 95.7 |

As will be apparent from the data summarized in the preceding Table, the catalysts of this invention (Catalyst Nos. 1 and 2) lead to an increased conversion of initial ethylenic unsaturation after three hours when compared to a well known prior art catalyst (Catalyst No. 3) which has been used commercially to selectively hydrogenate styrene-butadiene and styrene-isoprene block copolymers. As will also be apparent from the data summarized in the preceding Table, the catalyst of this invention prepared with methylalumoxane (Catalyst No. 1) is initially less active than is the well known prior art hydrogenation catalyst but more active than the catalyst prepared with methylalumoxane alone (Catalyst No. 4). This feature of the hydrogenation catalyst of this invention prepared with methylalumoxanes will, then, permit far more effective control of partial hydrogenation when this is a desired end result. In this regard, it should be noted that 83% of the initial ethylenic unsaturation is converted with catalyst 3 after only 30 minutes while the conversion with the catalyst of this invention prepared with a methylalumoxane was only 30.0% after 30 minutes.

While the present invention has been described and illustrated by reference to particular embodiments thereof, it will be appreciated by those of ordinary skill in the art that the same lends itself to variations not necessarily described or illustrated herein. For this reason, then, reference should be made solely to the appended claims for purposes of determining the true scope of the present invention.

Having thus described and illustrated the present invention, what is claimed is:

1. A catalyst prepared by combining one or more Group VIII metal compounds with one or more alkylalumoxanes and one or more alkyls or hydrides of metals selected from Groups Ia, IIa and IIIa of the Periodic Table of the elements in a ratio sufficient to provide an aluminum (from alkylalumoxanes) to Group VIII metal atomic ratio within the range from about 1.5:1 to about 20:1 and an aluminum (from alkyl and hydride) to Group VIII metal atomic ratio within the range from about 0.1:1 to about 20:1.

2. The catalyst of claim 1 wherein said one or more alkylalumoxanes and said one or more alkyls or hydrides are combined sequentially with the one or more alkylalumoxanes being first contacted with said one or more Group VIII metal compounds.

3. The catalyst of claim 2 wherein said one or more alkyls or hydrides is a trialkyl aluminum.

4. The catalyst of claim 2 wherein said one or more Group VIII metal compounds is selected from the group consisting of metal carboxylates, metal alkoxide, metal chelates, metal salts of sulfur-containing acids, and metal salts of sulfur-containing acid partial esters.

5. The catalyst of claim 4 wherein said one or more Group VIII metal compounds is a metal carboxylate.

6. The catalyst of claim 5 wherein said metal carboxylate contains from 1 to about 50 carbon atoms.

7. The catalyst of claim 4 wherein said one or more Group VIII metal compounds is a Group VIII metal carboxylate containing from about 5 to about 30 carbon atoms.

8. The catalyst of claim 7 wherein said Group VIII metal is selected from the group consisting of nickel and cobalt.

9. The catalyst of claim 8 wherein said one or more Group VIII metal compounds is nickel-2-ethylhexanoate.

10. The catalyst of claim 4 wherein said one or more Group VIII metal compounds is an alkoxide.

11. The catalyst of claim 10 wherein said Group VIII metal is selected from the group consisting of nickel and cobalt.

12. The catalyst of claim 11 wherein said one or more alkylalumoxanes is a methylalumoxane.

13. The catalyst of claim 11 wherein said one or more alkylalumoxanes is an ethylalumoxane.

14. The catalyst of claim 11 wherein said alkyls or hydrides is a trialkyl aluminum.

* * * * *